(12) United States Patent
Liu et al.

(10) Patent No.: US 7,680,197 B2
(45) Date of Patent: Mar. 16, 2010

(54) APPARATUS AND METHOD FOR SAMPLING TIMING COMPENSATION IN MULTI-CARRIER SYSTEM

(75) Inventors: Der-Zheng Liu, Tainan (TW); Tai-Cheng Liu, KaoHsiung (TW); Song-Nien Tung, KaoHsiung (TW); Kuang-Yu Yen, TaiChung (TW)

(73) Assignee: Realtek Semiconductor Corp., Taiwan (CN)

( * ) Notice: Subject to any disclaimer, the term of this patent is extended or adjusted under 35 U.S.C. 154(b) by 947 days.

(21) Appl. No.: 10/803,047

(22) Filed: Mar. 18, 2004

(65) Prior Publication Data
US 2004/0184551 A1 Sep. 23, 2004

(30) Foreign Application Priority Data
Mar. 21, 2003 (TW) ............................... 92106239 A (51) Int. Cl.
*H04K 1/10* (2006.01)
*H04L 7/00* (2006.01)
(52) U.S. Cl. ...................................... 375/260; 375/355
(58) Field of Classification Search ......... 375/140–157, 375/260, 355, 371, 362
See application file for complete search history.

(56) References Cited

U.S. PATENT DOCUMENTS

| | | | |
|---|---|---|---|
| 4,987,386 A | 1/1991 | Poklemba | |
| 5,285,474 A | 2/1994 | Chow et al. | |
| 5,790,604 A | 8/1998 | Kelton | |
| 6,373,861 B1 | 4/2002 | Lee | |
| 6,658,063 B1 | 12/2003 | Mizoguchi et al. | |
| 6,862,262 B1* | 3/2005 | Imamura | 370/210 |
| 6,928,120 B1* | 8/2005 | Zhang | 375/260 |
| 7,009,932 B2* | 3/2006 | Matheus et al. | 370/208 |
| 7,027,464 B1* | 4/2006 | Nakahara et al. | 370/503 |
| 7,058,002 B1* | 6/2006 | Kumagai et al. | 370/203 |
| 7,123,670 B2* | 10/2006 | Gilbert et al. | 375/344 |
| 7,139,320 B1* | 11/2006 | Singh et al. | 375/260 |
| 7,149,266 B1 | 12/2006 | Imamura | |

(Continued)

FOREIGN PATENT DOCUMENTS

EP 1331783 A2 * 7/2003

(Continued)

OTHER PUBLICATIONS

"Application of the ADC1210 CMOS A/D Converter"; National Semiconductor Application Note 245, Apr. 1986.*

*Primary Examiner*—Temesghen Ghebretinsae
(74) *Attorney, Agent, or Firm*—Rabin & Berdo, P.C.

(57) ABSTRACT

The present invention provides an apparatus and an associated method for sampling timing compensation, which can estimate sampling frequency offset between the receiver and transmitter of a multi-carrier system according to estimated frequency responses of two consecutive received symbols within each pilot subchannel, and compensate an accumulated sampling timing offset resulted from the sampling frequency offset. When the accumulated timing offset is not large, the apparatus uses a phase rotator to compensate with a corresponding accumulated phase rotation in frequency domain. When the accumulated timing offset is large, the apparatus first compensates with a specific timing offset in time domain, and then uses the phase rotator to compensate with a phase rotation corresponding to the remaining timing offset in frequency domain. A timing controller is used to compensate with the specific timing offset by adjusting a clock generator or a cyclic prefix remover of the receiver.

14 Claims, 6 Drawing Sheets

U.S. PATENT DOCUMENTS

| | | |
|---|---|---|
| 7,158,542 B1 | 1/2007 | Zeng et al. |
| 7,203,245 B1 | 4/2007 | Murphy |
| 7,310,302 B2 | 12/2007 | Cimini |
| 7,324,599 B2 | 1/2008 | Frank |
| 2002/0101840 A1 | 8/2002 | Davidsson |
| 2003/0099312 A1 | 5/2003 | Gummadi |
| 2003/0108127 A1* | 6/2003 | Eilts et al. .................. 375/340 |
| 2003/0128660 A1* | 7/2003 | Ito et al. ..................... 370/210 |
| 2003/0142766 A1 | 7/2003 | Golanbari |
| 2003/0231718 A1 | 12/2003 | Jiang |
| 2004/0100939 A1 | 5/2004 | Kriedte |
| 2004/0170227 A1 | 9/2004 | Frank |
| 2004/0170237 A1 | 9/2004 | Chadha et al. |
| 2004/0190560 A1 | 9/2004 | Maltsev et al. |
| 2005/0169165 A1 | 8/2005 | Cimini |
| 2007/0248199 A1 | 10/2007 | Steele |

FOREIGN PATENT DOCUMENTS

| | | |
|---|---|---|
| EP | 1478150 A2 * | 11/2004 |
| JP | 09-093302 | 4/1997 |
| JP | 11-308821 | 11/1999 |
| JP | 2001-53712 | 2/2001 |

* cited by examiner

APPARATUS AND METHOD FOR SAMPLING TIMING COMPENSATION IN MULTI-CARRIER SYSTEM

BACKGROUND OF THE INVENTION (a). Field of the Invention

The present invention relates in general to a communication system, and more particularly to an apparatus for estimating and compensating sampling timing offset in a multi-carrier system and a method thereof.

(b). Description of the Prior Arts

Figure 1:
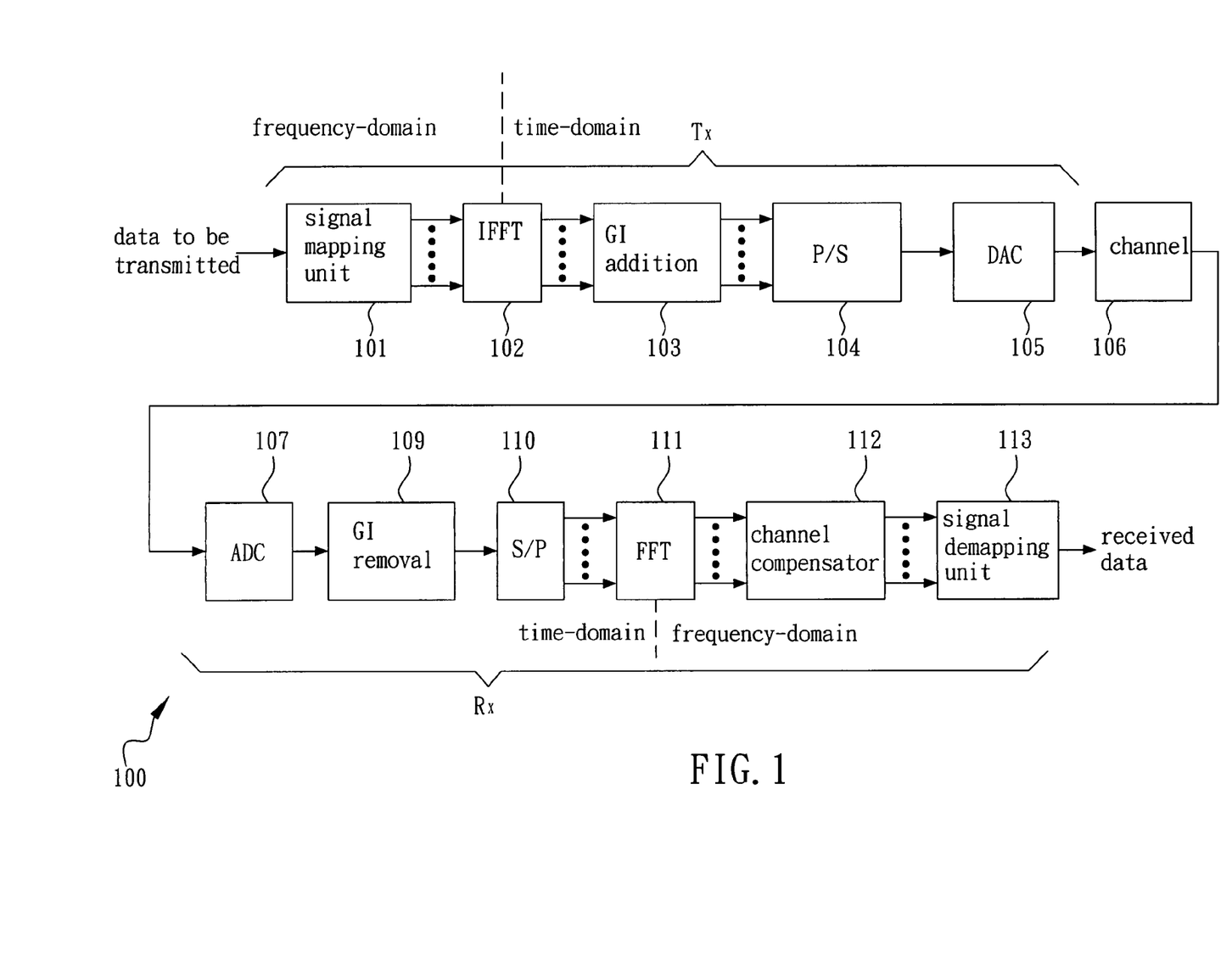
FIG. 1 is a block diagram of a typical multi-carrier system.

In recent years, multi-carrier technology is widely applied to high-speed communication systems, such as asymmetric digital subscriber loop (ADSL), IEEE 802.11 a/g wireless local area network (WLAN), etc. FIG. 1 is a block diagram of a typical multi-carrier system 100. The transmitter of the multi-carrier system 100 first distributes the data under transmission into N frequency-domain subchannels (N=$2^n$, n is an integer) via a signal mapping unit 101, and maintains the orthogonality among the signals of each subchannel to prevent inter-carrier interference (ICI). Next, an inverse fast Fourier transform (IFFT) device 102 is used to transform the subchannel signals into time-domain signals, to which a guard interval (GI) is added by a GI adding device 103. Then, each of these time-domain signals is passed through a parallel-to-serial converter (P/S) 104 and a digital-to-analog converter (DAC) 105, and then transmitted via a channel 106. The receiver of the multi-carrier system 100 first uses an analog-to-digital converter (ADC) 107 to sample the received time-domain signals. Next, the guard interval of the sampled signals is removed by a GI removing unit 109. The result thereof is provided to a serial-to parallel converter (S/P) 110, and then a fast Fourier transform (FFT) device 110 is used for transforming to frequency-domain signals. Last, the receiver compensates these frequency-domain signals by a channel compensator 112 and performs signal demodulation via a signal demapping unit 113 to recover to the original transmitted data.

A set of N-point IFFT output is typically called a symbol. Since the channel impulse response (CIR) is usually not ideal, a received symbol after passing through the channel 106 would impact the reception of subsequent symbols, i.e. inter-symbol interference (ISI). To prevent ISI, an additional guard interval (GI) is added between two symbols. Two typical ways to implement the guard interval are zero-padding (ZP) and cyclic prefix (CP). In ZP, a string of zero is added as the guard interval and energy efficiency is thus improved. In CP, a latter portion of a symbol is copied and put before the symbol as the guard interval. CP can reduce the ICI resulted from the channel impulse response. The circuits 103 and 109 of FIG. 1 are used to add and remove the guard interval respectively.

When demodulating the received time-domain signals, the receiver of the system 100 needs to transform them into frequency-domain signals by the FFT device 111 and performs the demodulation within each subchannel respectively. If synchronization error exists in the time-domain signals inputted to the FFT device 111, then additional ICI and phase rotation would be generated in the outputted frequency-domain signals to damage the orthogonality of the outputted frequency-domain signals. For a multi-carrier system, the synchronization error mainly results from sampling frequency offset and sampling phase error. Besides the additional ICI and phase rotation, the sampling frequency offset would generate an accumulated sampling timing offset, which may cause ISI to degrade the system performance.

In view of this, the present invention provides an apparatus and a method that can estimate and compensate the accumulated sampling timing offset by using pilot signals of a symbol, thereby upgrading the performance of a multi-carrier system.

SUMMARY OF THE INVENTION

The present invention is generally applied to a communication system which encodes data as symbol signals at the transmitter and transmits the symbol signals via a plurality of subchannels. The symbol signal includes at least two pilot signals. The subchannels include at least two pilot subchannels for transmitting a corresponding one of the pilot signals. The pilot signal is predetermined, and the present invention employs it to estimate and compensate sampling timing offset, thereby preventing the sampling timing offset from impacting signal demodulation at the receiver of the communication system.

Accordingly, in attainment of the aforementioned object, the present invention provides an apparatus for sampling timing compensation at the receiver of the communication system. The apparatus includes: a pilot subchannel estimator for generating an estimated frequency response of the symbol signal for the pilot subchannel according to the corresponding pilot signal; a timing offset estimator, coupled to the pilot subchannel estimator, for generating an estimated sampling frequency offset according to the estimated frequency responses of both the symbol signal and a following symbol signal for the pilot subchannels, and calculating an accumulated timing offset according to the estimated sampling frequency offset; and a phase rotator, coupled to the timing offset estimator, for performing sampling timing compensation according to an accumulated phase rotation corresponding to the accumulated timing offset.

In another aspect, the present invention provides a method for sampling timing compensation used at the receiver. The method includes: generating an estimated frequency response of the symbol signal for each of the pilot subchannels according to the corresponding pilot signal; generating an estimated sampling frequency offset according to the estimated frequency responses of both the symbol signal and a following symbol signal for the pilot subchannels; calculating an accumulated timing offset according to the estimated sampling frequency offset; and performing sampling timing compensation according to an accumulated phase rotation corresponding to the accumulated timing offset.

DETAILED DESCRIPTION OF THE EMBODIMENTS

Figure 2:
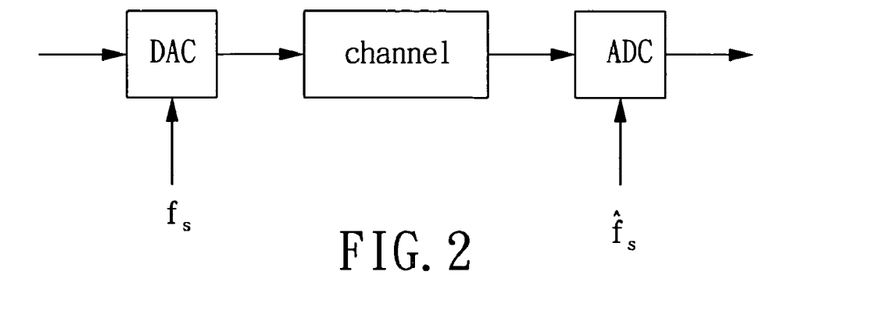
FIG. 2 is a block diagram showing a multi-carrier system with a sampling frequency offset.

The preferred embodiments of the present invention used in a multi-carrier system are described in detail below. FIG. 2 is a block diagram showing a multi-carrier system with a sampling frequency offset. In FIG. 2, since the sampling frequency $f_s=1/T_s$ of the DAC at the transmitter is not consistent with the sampling frequency $\hat{f}_s=1/\hat{T}_s$ of the ADC at the receiver, a sampling frequency offset $\Delta f_s = f_s - \hat{f}_s$ is generated. Here $T_s$ and $\hat{T}_s$ denote the sampling intervals of the transmitter and receiver respectively. Accordingly, the sampling interval of the receiver can be represented as $$\hat{T}_S = 1/(f_s - \Delta f_s) = T_s/(1-\Delta) \approx T_s \cdot (1+\Delta), \text{ where } \Delta = \Delta f_s/f_s = \Delta f_s T_s.$$

Figure 3A:
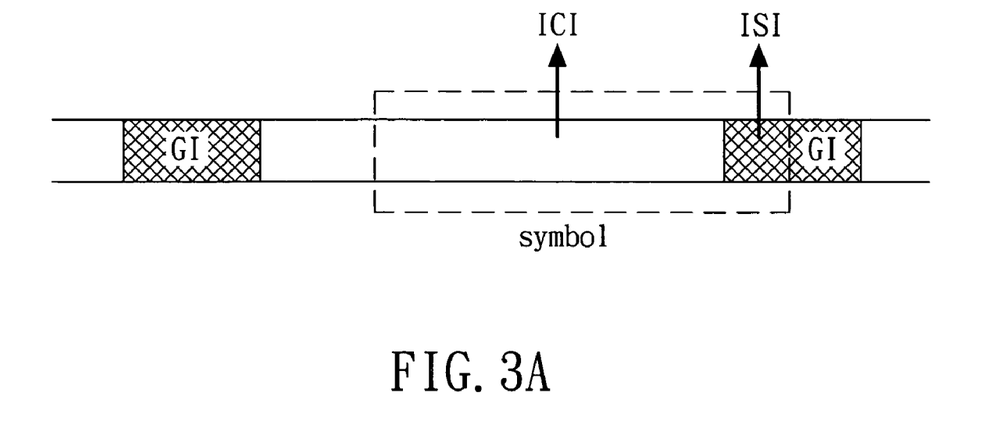
FIG. 3A is a diagram showing that the symbol boundary of a received symbol signal is shifted backwards.
Figure 3B:
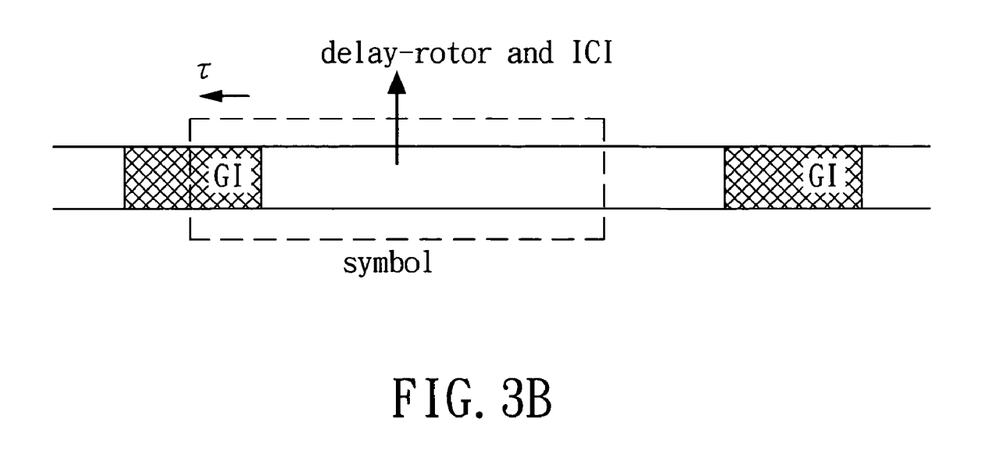
FIG. 3B is a diagram showing that the symbol boundary of a received symbol signal is shifted forwards.

Due to the sampling frequency offset, a symbol boundary error is accumulated. Thus, the received signals at the receiver may suffer ISI, delay-rotor, and ICI, as shown in FIG. 3A and 3B. FIG. 3A is a diagram showing that the symbol boundary of the received symbol is shifted backwards. The backward shift of the symbol boundary results from a positive sampling frequency offset $\Delta f_s$, i.e. the sampling frequency of the transmitter is larger than that of the receiver. As shown in FIG. 3A, in addition to ICI, the backward shift of the symbol boundary would result in ISI since the symbol covers parts of the following symbol. FIG. 3B is a diagram showing that the symbol boundary of the received symbol is shifted forwards. The forward shift of the symbol boundary results from a negative sampling frequency offset $\Delta f_s$, i.e. the sampling frequency of the transmitter is smaller than that of the receiver. As shown in FIG. 3B, in addition to ICI, the forward shift of the symbol boundary would result in an accumulated sampling timing offset $\tau$ which causes an accumulated phase rotation generated in each subchannel signal of the received symbol after performing FFT, i.e. a delay-rotor effect is generated.

Further, the influence of the sampling frequency offset on a symbol can be explained in terms of time domain and frequency domain. In the aspect of time domain, if time-domain signals of the symbol have $N+N_{GI}$ sampling points, where N is the number of points outputted from FFT and $N_{GI}$ is the number of points of a guard interval, then there is a sampling timing offset of $\epsilon = -(N+N_{GI})\Delta$ between the corresponding sampling points of two consecutive symbols. The sampling timing offset $\epsilon$ would result in a symbol boundary error in time domain, and cause an additional phase rotation $$-\omega_k \epsilon = 2\pi k \Delta \cdot \left(\frac{N+N_{GI}}{N}\right)$$

generated in the k-th subchannel signal of the symbol, where $$\omega_k = \frac{2\pi k}{N}$$

is the carrier frequency of the k-th subchannel signal.

In the aspect of frequency domain, if assuming that the frequency response of the i-th subchannel is fixed as $H_i$ and the i-th subchannel signal of the n-th symbol at the transmitter is $X_{n,i}$, then the k-th subchannel signal of the n-th symbol at the receiver is $$Y_{n,k} = e^{-j\omega_k(n\epsilon+\epsilon_0)} \cdot \sum_{i=0}^{N-1} H_i \cdot X_{n,i} \cdot \Phi(\omega_k - \omega_i') \quad (1\text{-}1)$$

$$= e^{-j\omega_k(n\epsilon+\epsilon_0)} \cdot H_k \cdot X_{n,k} \cdot \Phi(-\Delta\omega_k) +$$

$$\underbrace{e^{-j\omega_k(n\epsilon+\epsilon_0)} \cdot \sum_{i=0,(i\neq k)}^{N-1} H_i \cdot X_{n,i} \cdot \Phi(\omega_k - \omega_i')}_{ICI}$$

where $$\omega_i' = \omega_i \cdot \frac{f_s}{\hat{f}_s} \approx \omega_i \cdot (1+\Delta),$$

$-\omega_k(n\epsilon+\epsilon_0)$ is an accumulated phase rotation corresponding to the accumulated sampling timing offset, and $\epsilon_0$ is an initial sampling timing offset when the receiver begins to receive the first symbol. Besides, $\Phi(\omega)$ is the discrete-time Fourier transform (DTFT) of a rectangular window function with N points of 1, that is, $$\Phi(\omega) = \sum_{n=0}^{N-1} 1 \cdot e^{-jn\omega} = \frac{1 - e^{-jN\omega}}{1 - e^{-j\omega}} = e^{-j(N-1)\omega/2} \cdot \frac{\sin(N\omega/2)}{\sin(\omega/2)}$$

where $\omega = 2\pi fT$.

In equation (1-1), $\Phi(-\Delta\omega_k)$ is the distortion factor of each subchannel, where the amplitude distortion is $$\frac{\sin(\pi k \Delta)}{\sin(\pi k \Delta / N)}$$

and the phase distortion is $\pi k \Delta (N-1)/N$.

Since the pilot subchannel transmits a predetermined pilot signal, the following equation can be used to generate an estimated frequency response of the pilot subchannel:

$$\hat{H}_{n,k} = \frac{Y_{n,k}}{X_{n,k}} = e^{-j\omega(n\epsilon+\epsilon_0)} \cdot H_k \cdot \Phi(-\Delta\omega_k) + \Gamma_{n,k} \quad (1\text{-}2)$$

where k is the pilot index, $X_{n,k}$ is the predetermined pilot signal, and $\Gamma_{n,k}$ represents ICI and other noises.

Based on above analysis, the sampling frequency offset can be estimated by the phase error between the estimated frequency responses of two consecutive symbols. If the multi-carrier system employs K pilot subchannels, then the sampling frequency offset can be estimated by: calculating a respective phase difference between the estimated frequency responses of two consecutive symbols for each pilot subchannels; dividing a difference of the respective phase differences by a difference of the corresponding pilot indexes for any two of the K pilot subchannels to generate a plurality of dividing results; and then averaging the dividing results. That is, $$\Delta \hat{\theta}_{n,k} = \angle \hat{H}_{n,k} - \angle \hat{H}_{n-1,k}, \; k=\text{pilot index}$$

$$-\frac{2\pi \hat{\varepsilon}_n}{N} = 2\pi \hat{\Delta}_n \frac{N+N_{GI}}{N} \quad (1\text{-}3)$$

$$= \frac{2}{K(K-1)} \cdot \sum_{\substack{k,l=\text{pilot index} \\ (k \ne l)}} \left( \frac{\Delta \hat{\theta}_{n,k} - \Delta \hat{\theta}_{n,l}}{k-l} \right)$$

where $\hat{\Delta}_n$ is the estimated sampling frequency offset for the n-th symbol. The accumulated sampling timing offset can then be estimated by using $\hat{\Delta}_n$, that is, $$\sum_{k=0}^{n} \hat{\varepsilon}_k = -(N+N_{GI}) \sum_{k=1}^{n} \hat{\Delta}_k \approx n\varepsilon \quad (1\text{-}4)$$

When the accumulated sampling timing offset is not large, the influence of the ICI term $\Gamma_{n,k}$ in equation (1-2) can be ignored, and the phase rotation resulted from the amplitude and phase distortion and the initial sampling timing offset $\varepsilon_0$ can be removed by channel compensation.

Thus, in this case, we only need to compensate the corresponding accumulated phase rotation in frequency domain.

Figure 4:
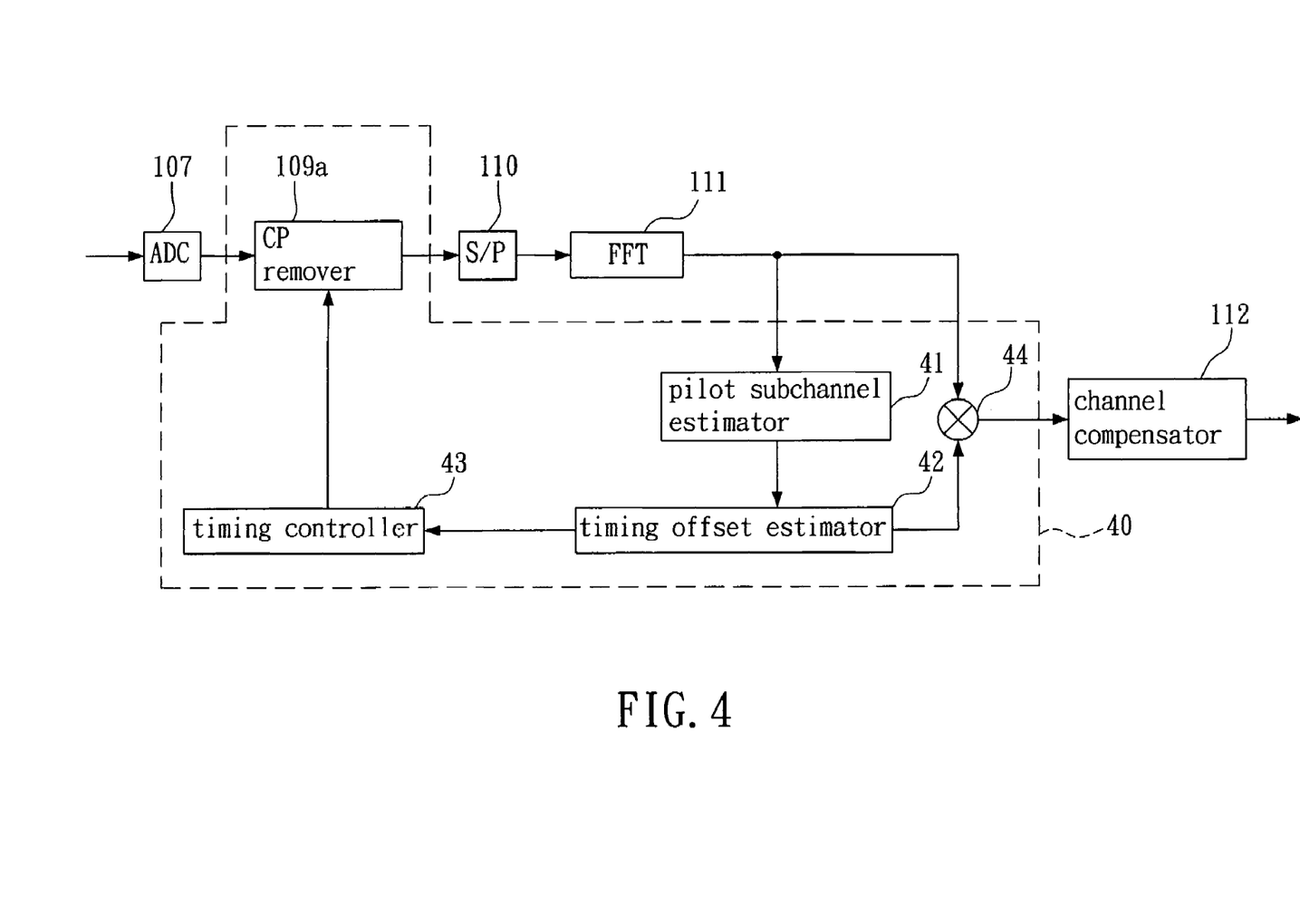
FIG. 4 is a block diagram of an apparatus for sampling timing compensation by adjusting a cyclic prefix remover according to the embodiment of the present invention.
Figure 6:
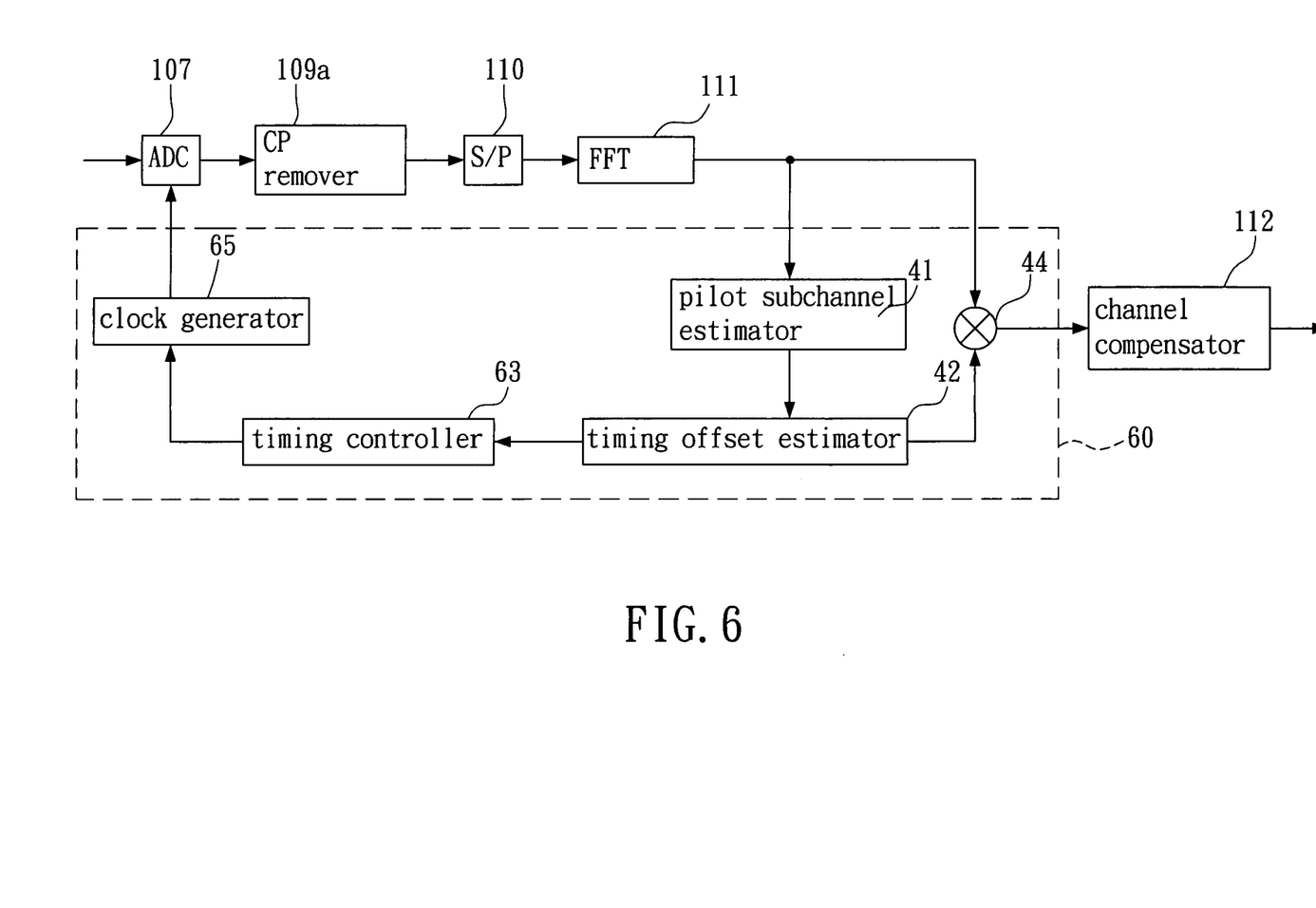
FIG. 6 is a block diagram of an apparatus for sampling timing compensation by adjusting a clock generator according to the embodiment of the present invention.

However, when the accumulated timing offset is large, in order to prevent the symbol boundary error from causing ISI, it is better to compensate with a specific sampling timing offset ρ in time domain. Here ρ is not exactly the result determined by equation (1-4). ρ is the timing offset which can be practically compensated in time domain in accordance with hardware characteristics, as described below with respect to FIG. 4 and FIG. 6. Accordingly, in this case, before performing phase compensation in frequency domain, a phase rotation $$\omega_k \rho = \frac{2\pi k \rho}{N}$$

corresponding to the timing offset ρ, which has been compensated in time domain, is deducted from the accumulated phase rotation of each subchannel. The deducted accumulated phase rotation is then used for phase compensation.

FIG. 4 is a block diagram of an apparatus 40 for sampling timing compensation by adjusting a cyclic prefix remover according to the embodiment of the present invention. In this embodiment, a cyclic prefix is used as the guard interval. The apparatus 40 is deployed at the receiver of a multi-carrier system to compensate an accumulated timing offset and phase rotation of a received symbol resulted from sampling frequency offset between the receiver and transmitter. The multi-carrier system includes at least two pilot subchannels, each for transmitting a corresponding pilot signal of a symbol. The cyclic prefix containing latter sampling points of the symbol is prefixed to the symbol. The apparatus 40 includes: a pilot subchannel estimator 41 for generating an estimated frequency response of a received symbol for each pilot subchannel according to the corresponding pilot signal (as shown in equation (1-2)); a timing offset estimator 42, coupled to the pilot subchannel estimator 41, for generating an estimated sampling frequency offset according to the estimated frequency responses of two consecutive received symbols for the pilot subchannels (as shown in equation (1-3)), and calculating an accumulated timing offset according to the estimated sampling frequency offset (as shown in equation (1-4)); and a phase rotator 44, coupled to the timing offset estimator 42, for compensating the received symbol (i.e. $Y_{n,k}$ in equation (1-1)) according to an accumulated phase rotation corresponding to the accumulated timing offset.

Since the apparatus 40 can perform sampling timing offset compensation by adjusting a cyclic prefix remover, the apparatus 40 further includes: a cyclic prefix remover 109a for removing the cyclic prefix from the received symbol; and a timing controller 43, coupled to the timing offset estimator 42 and the cyclic prefix remover 109a, for delaying or advancing removal of the cyclic prefix performed by the cyclic prefix remover 109a.

When the accumulated timing offset calculated by the timing offset estimator 42 is larger than the sampling interval $T_s$ of the receiver, the timing controller 43 delays the cyclic prefix remover 109a by one sampling point. In response to this timing adjustment, a quantity of $T_s$ (i.e. the specific timing offset ρ for the case of FIG. 4) must be deducted from the accumulated timing offset, and an accumulated phase rotation corresponding to the deducted accumulated timing offset is then used for compensation.

When the accumulated timing offset is smaller than $-T_s$, the timing controller 43 advances the cyclic prefix remover 109a by one sampling point. In response to this timing adjustment, a quantity of $T_s$ must be added to the accumulated timing offset, and an accumulated phase rotation corresponding to the added accumulated timing offset is then used for compensation.

Figure 5:
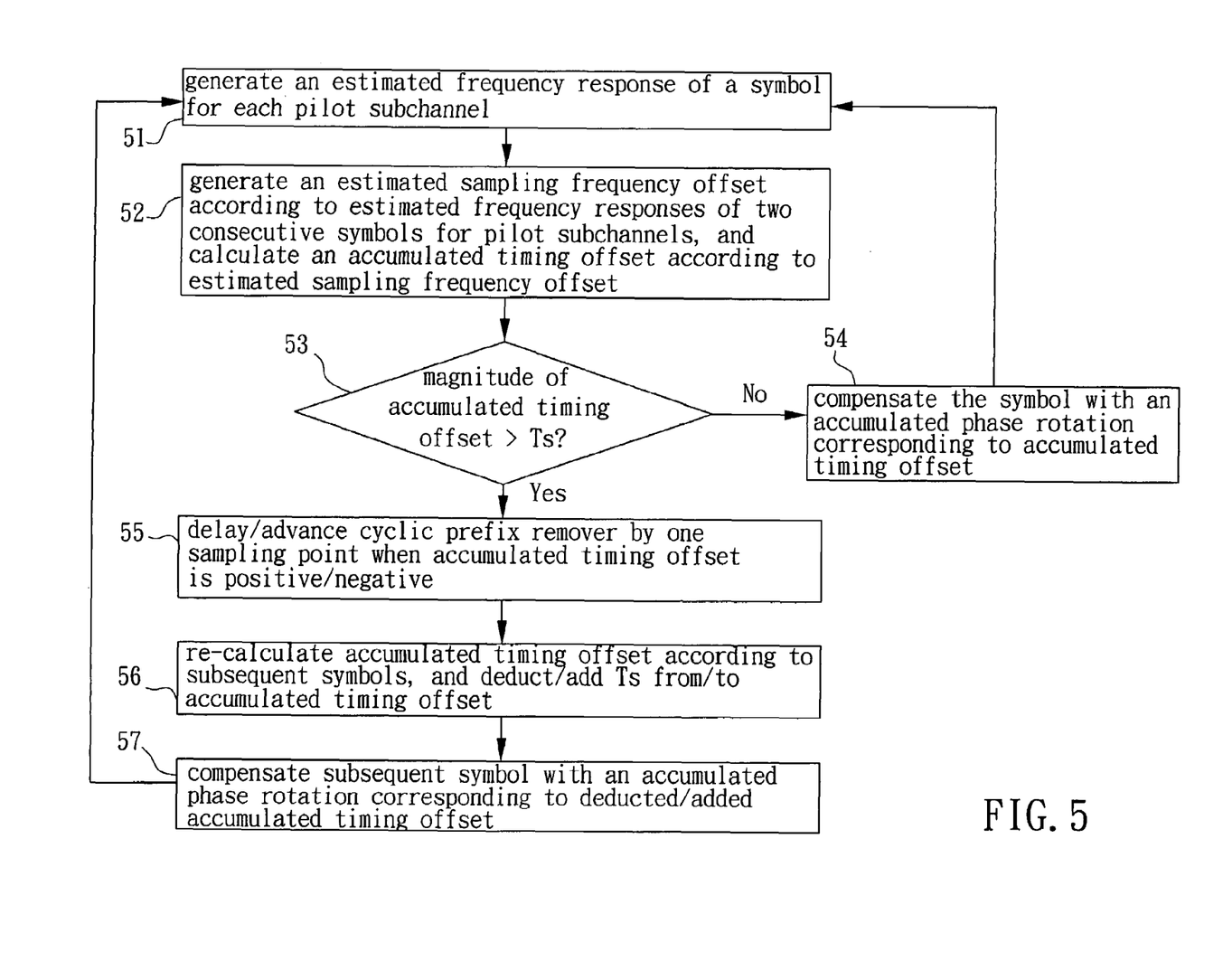
FIG. 5 is a flow chart of a method for sampling timing compensation by using the apparatus of FIG. 4 according to the embodiment of the present invention.

By applying the apparatus 40, the embodiment of the present invention provides a method for sampling timing compensation, which includes the steps as shown in FIG. 5:

51 generating an estimated frequency response of a received symbol signal for each pilot subchannel according to the corresponding pilot signal;

52 generating an estimated sampling frequency offset according to the estimated frequency responses of two consecutive received symbols for the pilot subchannels, and calculating an accumulated timing offset according to the estimated sampling frequency offset;

53 determining whether the magnitude of the accumulated timing offset is larger than $T_s$; if so, then proceeding to step 55;

54 compensating the received symbol with an accumulated phase rotation corresponding to the accumulated timing offset, and returning to step 51;

55 delaying/advancing the cyclic prefix remover 109a by one sampling point to remove the cyclic prefix when the accumulated timing offset is positive/negative;

56 re-calculating the accumulated timing offset according to subsequent received symbols, and deducting/adding a quantity of $T_s$ from/to the accumulated timing offset when the accumulated timing offset is positive/negative; and 57 compensating the subsequent received symbol with an accumulated phase rotation corresponding to the deducted/added accumulated timing offset, and returning to step 51.

FIG. 6 is a block diagram of an apparatus 60 for sampling timing compensation by adjusting a sampling clock of ADC according to the embodiment of the present invention. The apparatus 60 is deployed at the receiver of a multi-carrier system to compensate an accumulated timing offset of a received symbol resulted from sampling frequency offset between the receiver and transmitter. The multi-carrier system includes at least two pilot subchannels, each for transmitting a corresponding pilot signal of a symbol. As shown in FIG. 6, the apparatus 60 includes a pilot subchannel estimator 41, a timing offset estimator 42 and a phase rotator 44 which are all similar to the blocks with like numbers in the apparatus 40 of FIG. 4. Accordingly, the detailed description of these three blocks is not repeated here.

Since the apparatus 60 can perform sampling timing offset compensation by adjusting a sampling clock of ADC, the apparatus 60 further includes: a clock generator 65 for generating a sampling clock to an ADC 107 of the receiver, wherein the clock generator 65 is phase-adjustable with a minimum adjustable phase shift whose corresponding time interval is $T_f$, and $T_f$ is shorter than the sampling interval $T_s$ of the ADC 107; and a timing controller 63, coupled to the timing offset estimator 42 and the clock generator 65, for adjusting the clock generator 65 to generate the delayed or advanced sampling clock. It is notable that the clock generator 65 may include a phase-locked loop (PLL) circuit for adjusting the phase of the sampling clock. Besides, $T_f$ may be a fraction of $T_s$.

In the architecture of FIG. 6, when the accumulated timing offset calculated by the timing offset estimator 42 is larger than $T_f$, the timing controller 43 adjusts the clock generator 65 to generate the sampling clock delayed by the minimum adjustable phase shift. In response to this phase adjustment, a quantity of $T_f$ (i.e. the specific timing offset ρ for the case of FIG. 6) must be deducted from the accumulated timing offset, and an accumulated phase rotation corresponding to the deducted accumulated timing offset is then used for compensation.

On the other hand, when the accumulated timing offset is smaller than $T_f$, the timing controller 43 adjusts the clock generator 65 to generate the sampling clock advanced by the minimum adjustable phase shift. In response to the phase adjustment, a quantity of $T_f$ must be added to the accumulated timing offset, and an accumulated phase rotation corresponding to the added accumulated timing offset is then used for compensation.

Figure 7:
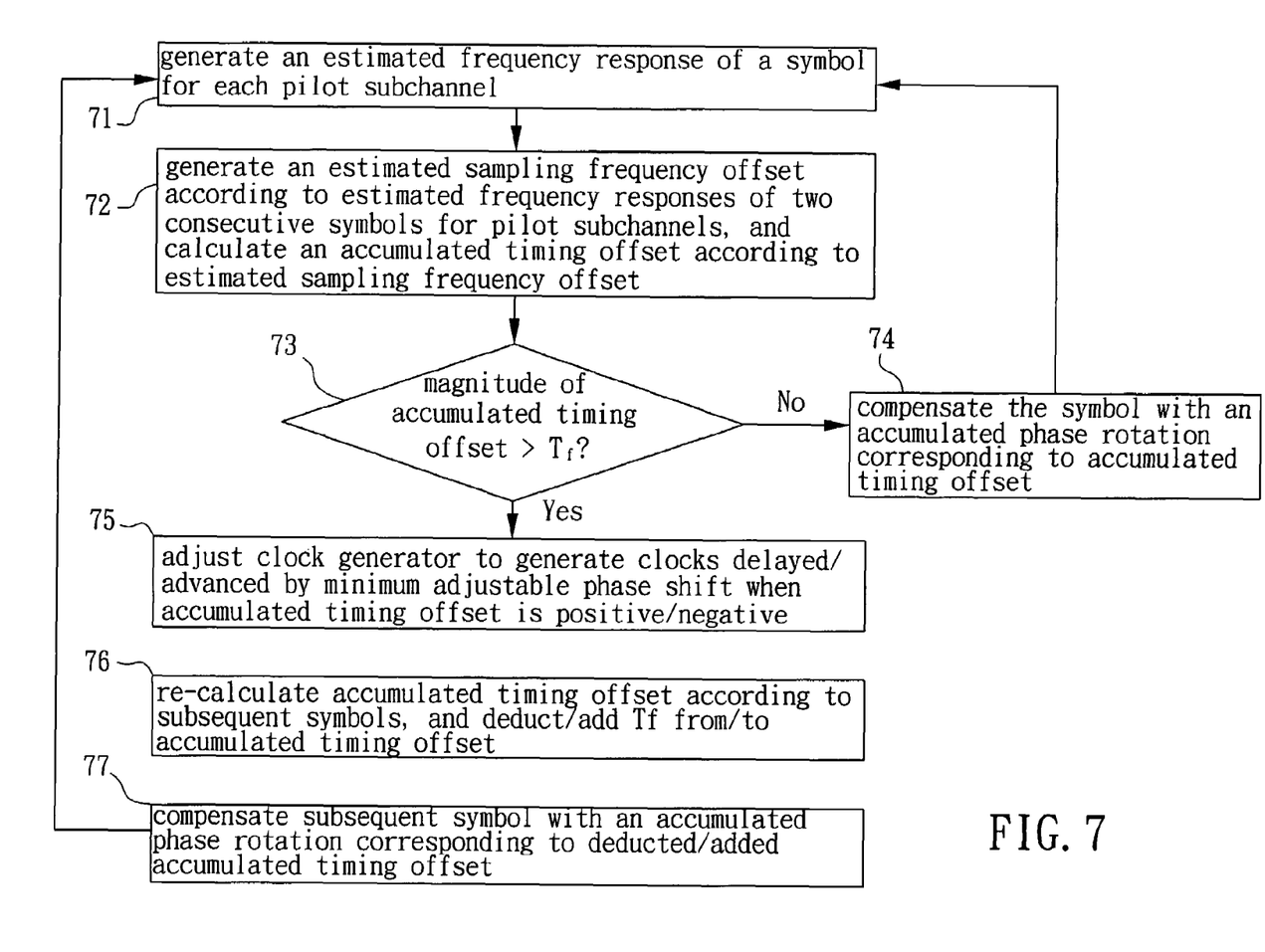
FIG. 7 is a flow chart of a method for sampling timing compensation by using the apparatus of FIG. 6 according to the embodiment of the present invention.

By applying the apparatus 60, the embodiment of the present invention provides a method for sampling timing compensation, which includes the steps as shown in FIG. 7:

71 generating an estimated frequency response of a received symbol for each pilot subchannel according to the corresponding pilot signal;

72 generating an estimated sampling frequency offset according to the estimated frequency responses of two consecutive received symbols for the pilot subchannels, and calculating an accumulated timing offset according to the estimated sampling frequency offset;

73 determining whether the magnitude of the accumulated timing offset is larger than $T_f$; if so, then proceeding to step 75;

74 compensating the received symbol with an accumulated phase rotation corresponding to the accumulated timing offset, and returning to step 71;

75 adjusting the clock generator 65 to generate a clock signal delayed/advanced by the minimum adjustable phase shift when the accumulated timing offset is positive/negative;

76 re-calculating the accumulated timing offset according to subsequent received symbols, and deducting/adding a quantity of $T_f$ from/to the accumulated timing offset when the accumulated timing offset is positive/negative; and 77 compensating the subsequent received symbol with an accumulated phase rotation corresponding to the deducted/added accumulated timing offset, and returning to step 71.

It is notable that if the multi-carrier system employs K pilot subchannels, then in both the steps 52 and 72, the estimated sampling frequency offset and the estimated timing offset can be generated according to equations (1-3) and (1-4) respectively.

While the present invention has been shown and described with reference to two preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. An apparatus for sampling timing compensation at a receiver of a communication system, wherein each of a first and a second symbol signals comprises two pilot signals transmitted via a first and a second pilot subchannels respectively, and the first and the second pilot subchannels comprise a first and a second pilot indexes respectively, the apparatus comprising:
   a pilot subchannel estimator for generating first frequency responses of two of the pilot signals transmitted over the first pilot subchannel and generating second frequency responses of the other two of the pilot signals transmitted over the second pilot subchannel;
   a timing offset estimator, coupled to the pilot subchannel estimator, for calculating a timing offset according to a first difference between the first frequency responses of the first and second symbol signals, a second difference between the second frequency responses of the first and second symbol signals and a subtraction between the first and second differences; and
   a phase rotator, coupled to the timing offset estimator, for performing sampling timing compensation according to a phase rotation corresponding to the timing offset.

2. The apparatus of claim 1, wherein the communication system is a multi-carrier system.

3. The apparatus of claim 1, wherein the timing offset estimator further comprises a phase difference calculating device for calculating the first difference and the second difference, and a divider for calculating the timing offset according to the subtraction between the first and second differences and the first and the second pilot indexes.

4. The apparatus of claim 1, further comprising:
   a timing controller for generating a control signal according to the timing offset;
   a clock generator for generating a sampling clock according to the control signal, wherein the phase of the sampling clock is adjusted according to the control signal; and
   an analog-to-digital converter (ADC) for converting the symbol signals according to the sampling clock.

5. The apparatus of claim 4, wherein a period of the sampling clock ($T_f$) is shorter than a sampling interval (Ts) of the ADC.

6. The apparatus of claim 5, wherein the period of the sampling clock ($T_f$) is a fraction of the sampling interval ($T_s$) of the ADC.

7. The apparatus of claim 4, wherein the clock generator further comprises a phase-locked loop (PLL) circuit.

8. A method for sampling timing compensation at a receiver of a communication system, wherein each of a first and a second symbol signals comprises two pilot signals transmitted via a first and a second pilot subchannels respectively, and the first and the second pilot subchannels comprise a first and a second pilot indexes respectively, the method comprising:

generating first frequency responses of two of the pilot signals transmitted over the first pilot subchannel;

generating second frequency responses of the other two of the pilot signals transmitted over the second pilot subchannel;

generating a first difference between the first frequency responses of the first and second symbol signals;

generating a second difference between the second frequency responses of the first and second symbol signals;

calculating a timing offset according to a subtraction between the first and the second differences; and performing sampling timing compensation according to a phase rotation corresponding to the timing offset.

9. The method of claim 8, wherein the timing offset is calculated according to the subtraction between the first and second differences and the first and the second pilot indexes.

10. The method of claim 8, further comprising:

generating a control signal according to the timing offset; and generating a sampling clock according to the control signal, wherein a phase of the sampling clock is adjusted according to the control signal.

11. An apparatus for sampling timing compensation at a receiver of a communication system, wherein each of a first and a second symbol signals comprises transmitted via a first a second pilot subchannels respectively, and the first and the second pilot subchannels comprise a first and a second pilot indexes respectively, the apparatus comprising:

a pre-FFT processing device for processing the first and the second symbol signals in a time domain;

a FFT for transforming the first and the second symbol signals from the time domain to a frequency domain;

a pilot subchannel estimator for generating first frequency responses of two of the pilot signals transmitted over the first pilot subchannel and generating second frequency responses of the other two of the pilot signals transmitted over the second pilot subchannel;

a timing offset estimator, coupled to the pilot subchannel estimator, for calculating a timing offset according to a first difference between the first frequency responses of the first and second symbol signals, a second difference between the second frequency responses of the first and second symbol signals and a subtraction between the first and second differences;

a phase rotator, coupled to the timing offset estimator, for performing sampling timing compensation according to a phase rotation corresponding to the timing offset; and a adjusting device for adjusting the operation of the pre-FFT processing device.

12. The method of claim 11, wherein the pre-FFT processing device includes an ADC.

13. The method of claim 12, wherein the adjusting device includes:

a timing controller for generating a control signal according to the timing offset; and a clock generator for generating a sampling clock according to the control signal for controlling the operation of the ADC, wherein the phase of the sampling clock is adjusted according to the control signal.

14. An method for sampling timing compensation at a receiver of a communication system, wherein each of a first and a second symbol signals comprises two pilot signals transmitted via a first and a second pilot subchannels respectively, and the first and the second pilot subchannels comprise a first and a second pilot indexes respectively, the method comprising:

processing the first and the second symbol signals in a time domain;

transforming the first and the second symbol signals from the time domain to a frequency domain;

generating first frequency responses of two of the pilot signals transmitted over the first pilot subchannel;

generating second frequency responses of the other two of the pilot signals transmitted over the second pilot subchannel;

generating a first difference between the first frequency responses of the first and second symbol signals;

generating a second difference between the second frequency responses of the first and second symbol signals;

calculating a timing offset according to a subtraction between the first and second differences;

performing sampling timing compensation according to a phase rotation corresponding to the timing offset; and adjusting the operation of the step of processing symbol signals in the time domain.

* * * * *